UNITED STATES PATENT OFFICE.

ROBERT ABBOTT HADFIELD, OF WESTMINSTER, ENGLAND.

MANUFACTURE OF STEEL.

1,410,749. Specification of Letters Patent. Patented Mar. 28, 1922.

No Drawing. Application filed May 26, 1920. Serial No. 384,444.

*To all whom it may concern:*

Be it known that I, Sir ROBERT ABBOTT HADFIELD, Bart., F. R. S., a subject of the King of Great Britain and Ireland, residing at Westminster, England, have invented Improvements in or Relating to the Manufacture of Steel, of which the following is a specification.

The successful utilization in an economical manner, of nickel chromium steel scrap, has heretofore presented considerable difficulty in practice, due to a large extent to the presence of the crominum therein.

An object of the present invention is to enable nickel chromium steel scrap to be economically remelted and utilized in the production of nickel chromium steel for reuse. It also has for its object to enable the nickel chromium steel scrap to be treated in such a manner as to enable a nickel chromium steel to be obtained therefrom of such purity, as regards sulphur and phosphorus, that it can advantageously be employed for various useful purposes.

It also has for its object to enable other steel scrap, including carbon steel scrap, containing the ordinary percentage of sulphur and phosphorus, to be economically treated in such a manner as to produce carbon steel, or alloy steel, of such purity as regards sulphur and phosphorus, that it can advantageously be employed in the manufacture of articles of various kinds, including tools, where a practically pure carbon steel, or pure alloy steel, can advantageously be used or is necessary.

According to the invention, nickel chromium steel scrap and also other alloy steel scrap and carbon steel scrap is purified in such a way that the resulting steel is very low in sulphur and phosphorus, the sulphur being under say .025%, for example of the order of .012 to .015%, and the phosphorus being under say about .015%, for example of the order of about .010 to .006%. In one example, the steel made as hereinafter described contains about .012% of sulphur and about .010% of phosphorus, that is to say, a total sulphur and phosphorus content of about .022%. By making nickel chromium or other steel very low in sulphur and phosphorus as set forth, not only are the inherent disadvantages of these elements in steel when present in the proportions usual in ordinary common nickel chromium steel, say .05 to .06% each of sulphur and phosphorus, or in good steel say .03 to .05% each of sulphur and phosphorus, or in very good steel, say .025 to .035% each of sulphur and phosphorus, very considerably reduced, or entirely eliminated, but the segregation that takes place in ingots or casting of such pure steel is very small and confined to the upper or discard portion or head of the ingot or casting that is afterwards cut off, so that an ingot or casting of remarkably pure and sound steel is obtained. This purity of the steel is found to be a matter of great importance in the case of large ingots or castings. The carbon and other elements, other than sulphur and phosphorus in such purified steel may vary according to the purpose for which the steel is to be used.

Nickel chromium steel of the purity described can advantageously be produced by refining ordinary nickel chromium steel scrap in an open hearth basic furnace.

To this end nickel chromium steel scrap may be remelted in a basic lined open hearth furnace with carbonaceous material, such as anthracite, and with lime, whereby a large proportion of the phophorus and chromium in the metal is oxidized during melting and taken up by the lime in the slag, and at the same time the metal is carburized to an extent sufficient to allow for subsequent boiling of the charge. The resulting slag is then removed from the surface of the molten metal. For the purpose of further refining the steel in the open hearth furnace so that it shall finally be very low in sulphur and phosphorus, a further quantity of lime and also iron oxide are added to the partly refined metal. The charge or heat is then brought to the boil by the interaction of the carbon of the metal with the oxygen of the iron oxide and at the same time further oxidizing the sulphur and phosphorus. This boiling operation is continued until the percentage of carbon in the metal has been very considerably reduced, say for example to the order of about .3% or less. By this means, owing to the ebullition of the bath and the reaction that takes place, the metal will be raised to a fairly high temperature and the percentage of the sulphur will have been reduced by the lime to a low value, say of the order of about .020% or less, and the percentage of phosphorus will be reduced to a still further extent, say to the order of about .01% or less. At this stage the resulting slag is removed to prevent reduction of phosphorus therefrom and its return to the metal, the boil afterwards being stopped by the addition to the bath of ferro-silicon or equivalent de-oxidizing material. The bath is then again recovered with a fairly thick layer of lime to remove further sulphur and at the same time protect the metal, as far as possible, from oxidation by contact with air in the furnace, the heating being continued for a further period to enable additional sulphur to be removed from the metal by the lime and the percentage thereof to be reduced to a very low figure. During the process fluor spar may be added to the slag.

In this way the sulphur present in the metal can be reduced to the order of about .012% or less, and the phosphorus to the order of about .010% down to say .006%.

The composition of the steel, as regards carbon, nickel and chromium can then, if desired, be adjusted to suit requirement, by the addition of pig iron of good quality, such as hæmatite pig, nickel and ferro-chrome, and the metal tapped into a ladle or other receptacle for casting into ingot or other moulds.

If it be desired further to purify the refined nickel chromium steel produced as described in the basic open hearth furnace, it may be afterwards further treated in an electric furnace wherein it is maintained in a molten state beneath a layer of lime and, it may be, carbonaceous material such as anthracite, for such a time and at such a temperature, as to allow of oxides therein becoming reduced under the reducing conditions prevailing and of disseminated slag rising to the top of the bath of metal and becoming absorbed by the layer of slag thereon. The refined and clarified pure nickel chromium steel thus obtained is then run off into a ladle or other receptacle, any desired addition of pig iron, nickel and chromium being made to the steel whilst in the electric furnace or whilst in the ladle or other receptacle.

The following is a more detailed description, given by way of example only, setting forth how such nickel chromium steel, low in sulphur and phosphorus, can be successfully carried into practice.

A charge of nickel chromium steel composed say of five tons of heavy steel scrap and five tons of lighter scrap, say steel turnings, for instance nickel chromium steel, or of carbon steel, or of a mixture of both, is charged at intervals into a basic lined open hearth furnace, the heavy scrap being added first and covered with say about five hundredweight of anthracite in the form of small pieces, and afterwards the lighter scrap and the whole gradually melted down, lime being added at intervals. During the melting, the major portion of the phosphorus will be oxidized and also a large proportion of the chromium, these oxidized elements passing into the slag produced. The heavy chromium slag is then removed. Lime and iron oxide, for example iron ore or iron scale, or both, are added to the bath of metal and the charge brought to the boil, further additions of lime and iron oxide being made at intervals and also, if desired, fluor spar to keep the slag sufficiently fluid, the boil being continued until the percentage of carbon in the metal is brought down to a low value, as hereinbefore mentioned. During this stage of the process, the percentage of sulphur will be reduced to a low value and the percentage of phosphorus will also be further reduced. When the percentages of sulphur and phosphorus have been reduced to a desired extent, as determined by analysis of samples of the metal, the resulting slag is removed and the boil stopped by addition of ferro-silicon. A fairly thick layer of lime is then added to protect the molten metal as far as possible from oxidization by air in the furnace and the heating of the metal continued to effect further removal of sulphur therefrom and reduce it to the desired low value. When this result is attained, any desired additions of pig iron, for instance hematite pig, nickel and ferro-chrome for the purpose hereinbefore mentioned, are made to the molten bath whilst in the furnace, after which the metal is tapped off and cast into ingot or other moulds.

If the refined steel is to be purified or clarified, as hereinbefore mentioned, the steel, before, it may be, the additions are made thereto in the open hearth furnace, or at least before the nickel and ferro-chrome additions are made, is tapped off and either used molten, or cast into convenient form for remelting, and afterwards transferred to or remelted in a basic electric furnace and covered with a layer of lime and anthracite and allowed to remain there for a suitable time in the molten condition and at a suitable temperature for the purpose hereinbefore mentioned. The required additions can afterwards be made thereto whilst in the furnace and the metal finally tapped off into a ladle preparatory to casting. Or the additions, or some of them, may be made to the steel whilst in the ladle.

Steel low in sulphur and phosphorus as set forth, can also be produced by remelting ordinary steel scrap other than nickel chromium steel scrap, and containing the ordinary percentages of sulphur and phosphorus, say from about .025 to .06% of each of these elements.

In this case steel scrap other than nickel chromium steel scrap, for instance ordinary carbon steel scrap, of commercial quality can be remelted in a basic lined open hearth furnace and treated therein substantially in the manner hereinbefore described with reference to the treatment of nickel chromium steel scrap, the sulphur present in the steel being thereby reduced to the order of say about .012% or less, and the phosphorus to the order of say about .010 to say .006%.

The composition of the steel, as regards carbon, can then be adjusted to suit requirements, by the addition of pig iron of good quality and the metal tapped into a ladle or other receptacle for casting into ingot or other moulds.

The refined carbon steel, or alloy steel, obtained in this case can also be further refined in an electric furnace in the manner and for the purpose hereinbefore described. Or ordinary steel scrap, including carbon steel scrap and nickel chromium steel scrap, containing the ordinary percentage of sulphur and phosphorus such as those hereinbefore mentioned, may be so treated that the elimination of the sulphur is facilitated and steel obtained that is not only low in sulphur and phosphorus but also low in manganese, say below .2%, and whereby the production of steel of a practically pure nature can be produced in an advantageous manner in a basic open hearth furnace.

To this end, a charge of ordinary steel alloy, scrap, for instance carbon steel scrap, or nickel chromium steel scrap, or a mixture thereof, is melted in a basic open hearth furnace with manganese steel scrap, carbon, in the form say of anthracite and lime, say in the form of limestone, being added to the charge. During the melting of the charge, oxide of iron, conveniently, mill scale, may be added to the charge, particularly when the charge consists of or contains nickel chromium steel, with the object of fluidifying the slag when this is of a refractory nature. The resulting slag is then removed from the surface of the molten metal and a further quantity of lime added to the molten metal. The melted charge is then brought to the boil, oxide of iron, for example mill scale, being added at frequent intervals, and also it may be fluor spar, for rendering the slag sufficiently fusible, especially when the slag contains chromium oxide. During this treatment the percentages of carbon, sulphur, phosphorus and manganese are considerably reduced. After the boiling has continued for a suitable time the resulting slag is removed and lime rapidly fed into the furnace and over the metal bath to form another slag and the boiling process continued until the carbon is reduced to the order of say about .3% or less. The boil is then stopped, as by the addition of ferro-silicon or equivalent material. Further lime is added and pig iron of good quality added to adjust the percentage of carbon to the desired amount. For the production of nickel chromium steel, adjustment for nickel may be made by adding nickel to the bath before the addition of the pig iron, and adjustment for chromium may be made by addition of ferro-chrome to the bath shortly before tapping the refined steel from the furnace.

Owing to the use of scrap of the type known as manganese steel in the charge, elimination of sulphur by the manganese present, takes place in an effective manner during the melting and earlier stages of the refining treatment so that there will be a smaller quantity of sulphur present to be dealt with in the later stages of the refining treatment.

By carrying out the invention in this way there can be obtained, in an advantageous manner, steel very low in sulphur and phosphorus, and also low in maganese.

The following is a more detailed description, given by way of example only, setting forth how this modified process can be carried into practice in connection with the treatment of ordinary nickel chromium steel scrap for the production of practically pure nickel chromium steel.

According to this example, a charge consisting say of fourteen tons of ordinary nickel chromium steel scrap, one and a half tons of ordinary manganese steel scrap and about eight hundredweights of anthracite, is introduced, with lime, into a hot basic open hearth furnace at intervals extending over say about three hours and the charge melted in about eight and three quarters hours from starting to charge the furnace, mill scale being added from time to time to fluidify the heavy chromium oxide slag produced. The resulting slag is then removed from the surface of the molten metal and a further quality of lime added thereto. The molten metal is then brought to the boil and the boiling continued, mill scale and lime being added at frequent intervals and also fluor spar with the object of thinning out the heavy viscous chromium oxide slag that will be produced. After the boiling has continued for a suitable time, say for example about one hour, the slag is removed and lime fed rapidly over the bath of molten metal to form another slag, the boiling being continued. When the percentage of carbon has fallen say to about .30% which may take place say in about three hours from the commencement of boiling, the boiling operation is stopped and further lime added to the bath. Suitable additions of pig iron, nickel and ferro-chrome are made at convenient times to the bath to obtain the desired percentages of these elements in the finished steel. After a further suitable interval, the resulting steel is tapped off into a ladle.

In this way there can be obtained refined or pure nickel chromium or other steel containing about .012% or less of sulphur and about .008% or less of phosphorus, manganese being low, say .2% or less.

In this case also the steel obtained can be further purified in an electric furnace in the manner and for the purpose hereinbefore described.

The segregation that takes place in the ingots or castings of pure steel produced in each of the ways described, is very small and confined to the upper or discard portion or head of the ingot or casting.

The processes hereinbefore described can of course be variously modified in detail to suit varying requirements without departing from the essential features thereof.

Refined steels produced as hereinbefore described and containing extremely low percentages of sulphur and phosphorus, and with any desired percentage of carbon or other elements, may advantageously be used for various purposes. Thus, refined carbon steel produced as herein described may be used as a base in the manufacture of special kinds of steels, as for instance high carbon or tool steel, manganese steel, manganese iron alloys and so forth for various purposes. Also, refined alloy steel, such for instance as refined nickel chromium steel produced as hereinbefore described and with any desired percentages of carbon and other elements, can be used for various purposes.

Refined steel produced as described can be heat treated in various ways other than by hardening and tempering it, as well as by hardening and tempering it, to impart to it special qualities.

What I claim is:—

1. A process for producing steel low in sulphur and phosphorus as herein defined, said process consisting in melting ordinary commercial steel scrap in an open hearth basic furnace with carbonaceous material and lime removing the resulting slag from the surface of the molten metal, adding a further quantity of lime and also iron oxide to the partly refined metal, bringing the molten metal to the boil and continuing the boiling until the percentage of the carbon in the metal is considerably reduced, namely to the order of about .3%, removing the resulting slag, adding deoxidizing material to the bath to stop the boil, again covering the bath with lime, continuing the heating of the bath to reduce the sulphur to the desired low percentage, adjusting the composition of the steel to suit requirement by suitable additions of the desired elements to the molten bath and casting the resulting refined steel.

2. A process for producing steel low in sulphur and phosphorus as herein defined, said process consisting in melting ordinary commercial steel scrap in an open hearth basic furnace with carbonaceous material and lime, removing the resulting slag from the surface of the molten metal, adding a further quantity of lime and also iron oxide to the partly refined metal, bringing the molten metal to the boil and continuing the boiling until the percentage of the carbon in the metal is considerably reduced, namely to the order of about .3%, removing the resulting slag, adding deoxidizing material to the bath to stop the boil, again covering the bath with lime, continuing the heating of the bath to reduce the sulphur to the desired low percentage, clarifying the resulting refined steel by heating it to a high temperature under deoxidizing conditions in a basic electric furnace adjusting the composition of the steel to suit requirement by suitable additions of the desired elements to the molten bath after the reduction of sulphur and phosphorus contents to the required extent and casting the refined and clarified steel.

3. A process for producing steel low in sulphur and phosphorus as herein defined, said process consisting in melting ordinary commercial steel scrap in an open hearth basic furnace with carbonaceous material and lime, removing the resulting slag from the surface of the molten metal, adding a further quantity of lime and also iron oxide to the partly refined metal, bringing the molten metal to the boil and continuing the boiling until the percentage of the carbon in the metal is considerably reduced, namely to the order of about .3%, removing the resulting slag, adding deoxidizing material to the bath to stop the boil, again covering the bath with lime, continuing the heating of the bath to reduce the sulphur to the desired low percentage, clarifying the resulting refined steel by heating it to a high temperature, adjusting the composition of the steel to suit requirement by suitable additions of the desired elements to the molten bath after the reduction of sulphur and phophorus contents to the required extent, and casting the refined and clarified steel.

4. In a process for producing steel low in sulphur and phosphorus as herein defined, from ordinary commercial steel scrap, melting the steel scrap in a basic open hearth furnace in the presence of manganese, carbonaceous material and lime.

5. In a process for producing steel low in sulphur and phosphorus as herein defined, from ordinary commercial steel scrap, melting the steel scrap in a basic open hearth furnace in the presence of manganese, carbonaceous material, lime and iron oxide.

6. In a process for producing steel low in sulphur and phosphorus as herein defined, from ordinary commercial steel scrap, melting the steel scrap in a basic open hearth furnace with manganese steel scrap, carbon and lime, being added to the charge during the melting thereof.

7. In a process for producing steel low in sulphur and phosphorus as herein defined, from ordinary commercial steel scrap, melting the steel scrap in a basic open hearth furnace with manganese steel scrap in the presence of carbon and lime, oxide of iron being added to the charge during the melting thereof.

8. In a process for producing nickel chromium steel low in sulphur and phosphorus as herein defined, melting a charge of ordinary commecial steel scrap, comprising nickel chromium steel scrap, and manganese steel scrap, in a basic open hearth furnace in the presence of carbon and lime.

9. In a process for producing nickel chromium steel low in sulphur and phosphorus as herein defined, melting a charge of ordinary commercial steel scrap, comprising nickel chromium steel scrap, and manganese steel scrap in a basic open hearth furnace in the presence of carbon, lime and oxide of iron afterwards bringing the molten metal to the boil, continuing the boiling to reduce the sulphur and phosphorus contents to a low value and adding oxide of iron at intervals to the boiling molten bath.

10. A process for producing steel low in sulphur and phosphorus as herein defined from ordinary commercial steel scrap, said process consisting in melting a charge of ordinary steel scrap with manganese steel scrap in a basic open hearth furnace in the presence of carbon and lime, adding oxide of iron to the charge, removing the resulting slag from the surface of the molten metal, adding lime to the bath of metal, bringing the molten charge to the boil and continuing the boiling to reduce the sulphur and phosphorus contents thereof to a low value, removing the resulting slag, stopping the boil, covering the molten bath with lime, continuing the heating of the bath to reduce the sulphur and phosphorus contents of the molten metal to about the low values herein defined and subsequently casting the refined steel, the composition of the refined steel being adjusted to suit requirements by addition of the required elements to the molten steel after the sulphur and phosphorus contents have been reduced to the desired low value.

11. A process for producing nickel chromium steel low in sulphur and phosphorus as herein defined, said process consisting in melting a charge of ordinary steel scrap comprising nickel chromium steel scrap, with manganese steel scrap in a basic open hearth furnace in the presence of carbon and lime, removing the resulting slag from the surface of the molten metal, adding lime to the bath of metal, bringing the molten charge to the boil and continuing the boiling to reduce the sulphur and phosphorus contents of the molten metal to a low value, oxide of iron being added to the boiling charge at intervals, removing the resulting slag when the carbon in the metal has been reduced to a low value, stopping the boil by addition of deoxidizing material, covering the molten metal with a layer of lime and continuing the heating of the molten metal until the sulphur and phosphorus contents therein are reduced to the required low values as herein defined and subsequently casting the resulting refined steel, the composition of the refined steel being adjusted to suit requirement by addition of suitable additions of carbon, nickel and chromium to the molten steel before casting the same into ingots or castings.

12. A process for producing steel, according to which refined steel low in sulphur and phosphorus as herein defined and produced according to claim 10, is subjected to a clarifying treatment by heating it in a molten condition in a basic electric furnace under deoxidizing conditions as set forth.

13. A process for producing nickel chromium steel, according to which refined nickel chromium steel low in sulphur and phosphorus as herein defined and also low in manganese and produced according to claim 11, is subjected to a clarifying treatment by heating it in a molten condition in a basic electric furnace under a layer of lime and carbon and, after its composition has been adjusted to suit requirement, casting the refined and clarified steel.

14. Nickel chromium steel containing from about .25 to .7% of carbon, sulphur being below about .025% and phosphorus below about .015%.

15. Nickel chromium steel containing from about .25 to .7% of carbon, sulphur being below about .025%, phosphorus below about .015% and manganese varying up to about .2%.

16. Nickel chromium steel containing from about .25 to .7% of carbon, sulphur being of the order of about .010% and phosphorus being of the order of about .010% or below.

17. Nickel chromium steel containing from about .25 to .7% of carbon, sulphur being of the order of about .010%, phosphorus being of the order of about .010% or below and manganese varying up to about .2%.

Signed at London in the county of London, England, this twenty-ninth day of April 1920.

ROBERT ABBOTT HADFIELD.